United States Patent
Ebrahimian et al.

(10) Patent No.: US 6,797,760 B1
(45) Date of Patent: Sep. 28, 2004

(54) NON-DRIPPING, FLAME RETARDANT, FLUOROELASTOMER INSULATIVE COMPOSITIONS FOR TELECOMMUNICATION CABLES

(75) Inventors: Shahzad Ebrahimian, Rindye, NH (US); Mark A. Jozokos, Pelham, NH (US); Will Pavilionis, Worcester, MA (US)

(73) Assignee: AlphaGary Corporation, Leominster, MA (US)

( * ) Notice: Subject to any disclaimer, the term of this patent is extended or adjusted under 35 U.S.C. 154(b) by 15 days.

(21) Appl. No.: 09/688,328

(22) Filed: Oct. 13, 2000

Related U.S. Application Data

(60) Provisional application No. 60/159,790, filed on Oct. 15, 1999.

(51) Int. Cl.$^7$ ................................. C08K 3/34
(52) U.S. Cl. .................. 524/445; 524/447; 174/110 FC
(58) Field of Search ................................. 524/445, 446, 524/447, 543, 545, 546; 174/110 FC; 525/199; 523/209, 216

(56) References Cited

U.S. PATENT DOCUMENTS

| | | | |
|---|---|---|---|
| 5,773,502 A | 6/1998 | Takekoshi et al. | 524/411 |
| 5,840,796 A | 11/1998 | Badesha et al. | 524/449 |
| 6,217,797 B1 * | 4/2001 | Day et al. | 252/609 |
| 6,355,277 B1 * | 3/2002 | Day et al. | 252/609 |

FOREIGN PATENT DOCUMENTS

EP 0 709 429 1/1996

* cited by examiner

*Primary Examiner*—Peter Szekely
(74) *Attorney, Agent, or Firm*—McAndrews, Held & Malloy, Ltd.

(57) ABSTRACT

A non-dripping, flame retardant, fluoropolymeric insulative composition comprises: (a) a fluoropolymeric base polymer; and (b) a nanoclay additive. The preferred nanoclay additive is selected from the group consisting of synthetic silicate montmorillonites, natural layered silicate montmorillonites and a layered alumna-silicate. Such compositions are especially useful for coating wires and conductors employed in high-speed speed telecommunication data transmission cables. A method for preparing an exfoliated thermoplastic elastomer blend of a fluoropolymer and a nanocomposite comprising dynamically mixing said fluoropolymer and said nanocomposite in a ratio of from about 99:1 to about 50:50 parts by weight, respectively.

24 Claims, No Drawings

NON-DRIPPING, FLAME RETARDANT, FLUOROELASTOMER INSULATIVE COMPOSITIONS FOR TELECOMMUNICATION CABLES

CROSS-REFERENCE TO RELATED APPLICATION

The present application relates to and claims priority benefits from U.S. Provisional Patent Application Ser. No. 60/159,790 filed Oct. 15, 1999, entitled "Non-Dripping, Flame Retardant, Fluoroelastomer Compositions For Telecommunication Cables", which is incorporated by reference herein in its entirety.

FIELD OF THE INVENTION

The present invention relates to fluoroelastomer compositions based upon fluoropolymer blends, alloys, and fluoro/olefinic/polyvinylchloride polymer blends, as well as alloys with low smoke generation, low corrosivity, low heat release, flame retardancy and favorable char integrity with non-dripping characteristics. The preferred composition may be employed as insulation, insulation skin, jacket (sheath), buffer, crossweb (spline), shield, and/or separator materials in the manufacture of optical fiber or electrical wires and cables.

BACKGROUND OF THE INVENTION

The present non-dripping, flame retardant insulative compositions are fluoroelastomers with nanocomposite and flame retardant additives. The present compositions can be melt processed to form extruded articles. Such manufacturing process and the resulting articles also constitute a portion of the inventive contribution disclosed herein.

It is known that the incorporation of nanocomposite additives into fluoroelastomeric compositions can improve some of properties of the compositions, particularly combustion properties including non-dripping characteristics. The nanocomposites that are suitable for incorporation into the present compositions are preferably by montmorillonites (the main fraction of the clay mineral bentonite), which are layered alumino-silicate or magnesium-silicate materials whose individual platelets measure on the order of one micron diameter, giving them an aspect ratio of about 1000:1. It is this morphology that leads to increased barrier properties to moisture, resistance of the composition to deformation, resistance to whitening or blooming, improved mechanical strength, sizeable drop in heat release rate and smoke properties, improved flame retardancy and char integrity of the polymer compositions. The nanocomposite additives are preferably chemically modified to increase the hydrophobicity of their surfaces, thereby enhancing their fire performance effectiveness. It is also known that blending or alloying fluoroelastomeric compositions with suitable olefinic or polyvinylchloride (PVC) polymers improves the flexibility, electrical properties, and manufacturing costs of the resulting blend or alloy. Suitable polymers to make the blends and alloys of the present compositions are: polytetrafluoroethylene (PTFE) fluorocarbons, fluorinated ethylene/propylene (FEP) fluorocarbons, perfluoroalkoxy (PFA) fluorocarbons, ethylene tetrafluoroethylene (ETFE) fluoropolymers, polyvinylidene (PVDF) fluoropolymers, ethylene chlorotrifluoroethylene (ECTFE) fluoropolymers, fluoro-chlorinated homopolymers, copolymers and terpolymers, very low density polyethylene (VLDPE), low density polyethylene (LDPE), linear low density polyethylene (LLDPE), high density polyethylene (HDPE), polypropylene (PP), ethylene propylene copolymer or rubber (EPR), ethyl vinyl acetate (EVA), ethylene ethyl acrylate (EEA), ethylene methyl acrylate (EMA), ethylene butyl acrylate (EBA), and ethylene-based homopolymers, copolymers and terpolymers, and PVC-based homopolymers, copolymers and terpolymers.

The use of various flame retardant additives such as molybdates, metal hydrates, oxides, carbonates, talcs, clays, borates, stannates, phosphates, silicates, graphites, and carbon blacks will provide the resulting products with enhanced combustion properties.

The present fluoroelastomeric compositions may be crosslinked or grafted by any convenient method, such as by chemical crosslinking using organic peroxides, irradiation, and organosilanes or chemical grafting using acrylic and maleic acid.

The present thermoplastic fluoroelastomeric compositions have a high limiting oxygen index (LOI), and also burn with no visible smoke and/or dripping. The combination of favorable combustion, electrical and physical properties make the present compositions suitable for many applications such as cable components employed in market segments such as telecommunication, signal, power, industrial, and military cables.

SUMMARY OF THE INVENTION

The present non-dripping, flame retardant, fluoroelastomeric compositions comprise:

(a) a fluoropolymeric base polymer; and
(b) a nanoclay additive.

The preferred fluoropolymeric base polymer is selected from the group consisting of polytetrafluoroethylene (PTFE) fluorocarbons, fluorinated ethylene/propylene (FEP) fluorocarbons, perfluoroalkoxy (PFA) fluorocarbons, ethylene tetrafluoroethylene (ETFE) fluoropolymers, polyvinylidene (PVDF) fluoropolymers, ethylene chlorotrifluoroethylene (ECTFE) fluoropolymers, and fluoro-chlorinated homopolymers, copolymers and terpolymers.

The preferred composition further comprises at least one of an olefinic polymer, one of an acetate resin and an acrylate resin, and a polyvinylchloride resin.

The preferred olefinic polymer is selected from the group consisting of very low density polyethylene (VLDPE), low density polyethylene (LDPE), linear low density polyethylene (LLDPE), high density polyethylene (HDPE), polypropylene (PP), and ethylene propylene rubber (EPR). The group from which said olefinic polymer is selected can further consist of ethylene-based homopolymers, copolymers and terpolymers. The at least one olefinic polymer can be crosslinked, preferably using an organic peroxide.

The preferred one of an acetate resin and an acrylate resin is selected from the group consisting of ethyl vinyl acetate (EVA), ethylene ethyl acrylate (EEA), ethylene methyl acrylate (EMA), and ethylene butyl acrylate (EBA).

The preferred nanoclay additive is selected from the group consisting of synthetic silicate montmorillonites, natural layered silicate montmorillonites and a layered alumna-silicate. The individual platelets of the preferred nanoclay additive are approximately 1 micron in diameter. The nanoclay additive is preferably chemically modified to increase its hydrophobicity.

The preferred composition further comprises a filler selected from the group consisting of metal hydrates, oxides, carbonates, talcs, clays, molybdates, borates, stannates, carbon blacks, silicates, and phosphates.

The preferred composition may also further comprise an additive comprising at least one substance selected from the group consisting of an antioxidant, a pigment, and a lubricant.

A method for preparing an exfoliated thermoplastic elastomer blend of a fluoropolymer and a nanocomposite comprising dynamically mixing the fluoropolymer and the nanocomposite in a ratio of from about 99:1 to about 50:50 parts by weight, respectively. In the preferred method, at least one of an antioxidant, a lubricant and a pigment contacts said blend during mixing.

DETAILED DESCRIPTION OF THE PREFERRED EMBODIMENTS

Two primary parameters that effectively define the performance levels of data communication cables are electrical and combustion properties. Balancing these parameters is important to achieving optimal performance. Over the last few years, it has become apparent that the telecommunication industry is entering a period of revolutionary change. The challenge facing the telecommunication cable manufacturers is to comply with the higher data transmission speeds. The present compositions can be employed to provide solutions to the foregoing concerns from a material and cable design viewpoint.

Common telecommunication cable types include: (NEC Article 725) CL2; communication class 2 cables, CL2R: communication class 2 riser cables, CL2P: communication class 2 plenum cables, CL3: communication class 3 cables, CL3R: communication class 3 riser cables, CL3P: communication class3 plenum cables, PLTC: communication power-limited tray cables, (NEC Article 760): FPL: communication power-limited fire alarm cables, FPLR: communication power-limited fire alarm riser cables, FPLP: communication power-limited fire alarm cables, (NEC Article 770): OFC: conductive optical fiber cable, OFCR: conductive optical fiber riser cable, OFCP: conductive optical fiber plenum cable, OFN: nonconductive optical fiber cable, OFNR: nonconductive optical fiber riser cable, OFNP: nonconductive optical fiber plenum cable, (NECArticle800) CM: communication cable, CMR: communication riser cable, CMP: communication plenum cable (NEC Article 820): CATVD: community antenna television drop cable, CATVR: community antenna television riser cable, CATVP: community antenna television plenum cable.

The blends of the present composition comprise an important additive, namely, nanocomposites. The principal components of polymeric nanocomposites are water-swellable synthetic and natural layered silicates such as montmorillonites (the main fraction of the clay mineral bentonite). These polymeric nanocomposites are commonly employed and are commercially available in different types. The high aspect ratio (edge length:thickness of layer) of the layers strongly influences the properties of the polymeric composition. To obtain the value of the properties, the layers have to be separated (exfoliation). For addition to a polymer melt, the layered silicates are usually swollen, making exfoliation much easier than with the dry silicates. The swelling agent has to have a boiling point higher than the melting temperature of the base polymer but noticeably lower than the permissible melt processing temperature. The consistency of the mixture of silicate and swelling agent depends on the silicate/swelling agent relationship, the swellability of the silicate, the type of swelling agent and the temperature, and can range from liquid through slurry to a crumbly paste. By proper employment of nanocomposite in the polymer composition, the following performance advantages can be achieved:

(A) increased barrier properties to moisture, solvents, chemical vapors, gases such as $O_2$;
(B) increased modulus and tensile strength;
(C) higher heat distortion temperature;
(D) increased dimensional stability;
(E) reduced heat release and smoke properties;
(F) improved flame retardancy;
(G) improved colorability; and
(H) improved resistant to whitening or blooming.

Experimental Details

The present composition is further illustrated by preparing laboratory batches and investigating their physical, electrical, and combustion properties. The following compositions were prepared by compounding mixtures of each formulation. The details of the specific components used in these compositions are summarized below.

| POLYMER SYSTEM: | |
| --- | --- |
| Component | Description |
| PTFE Fluorocarbon | Polytetrafluoroethylene |
| FEP Fluorocarbon | Fluorinated Ethylene Propylene |
| PFA Fluorocarbon | Per-Fluoro-Alkoxy Resin |
| ETFE Fluoropolymer | Ethylene Tetrafluoro Ethylene |
| PVDF Fluoropolymer | Polyvinylidene Fluoride |
| ECTFE Fluoropolymer | Ethylene Chlorotrifluoroethylene |
| VLDPE | Very Low Density Polyethylene |
| LDPE | Low Density Polyethylene |
| LLDPE | Linear Low Density Polyethylene |
| HDPE | High Density Polyethylene |
| PP | Polypropylene |
| EPR | Ethylene Propylene Rubber |
| EVA | Ethyl Vinyl Acetate |
| EEA | Ethylene Ethyl Acrylate |
| EMA | Ethylene Methyl Acrylate |
| EBA | Ethylene Butyl Acrylate |
| MMA | Methylene Methyl Acrylate |
| PVC | Polyvinylchloride Resin |

Filler System: Metal hydrates, oxides, carbonates, talcs, clays, molybdates, borates, stannates, graphites, silicates, phosphates, carbon blacks and nanocomposite organoclays.
Additives: Antioxidants, pigments and lubricants.

The following example compositions were compounded using a laboratory Buss Kneader MKS (30 mm). A summary of composition details and test results is set forth in Table I below.

TABLE I

| Components | 1 phr | 2 phr | 3 phr | 4 phr | 5 phr | 6 phr | 7 phr | 8 phr |
| --- | --- | --- | --- | --- | --- | --- | --- | --- |
| PVDF Resin | 1–100 | 1–100 | 1–100 | 1–100 | 1–100 | 1–100 | 1–100 | 1–100 |
| Acrylate Copolymer | 1–50 | 1–50 | 1–50 | 1–50 | — | — | — | 1–50 |
| Acrylate Terpolymer | — | — | — | — | 1–50 | — | — | — |
| Ethylene/Acrylic Terpolymer | — | — | — | — | — | 1–50 | 1–50 | — |

TABLE I-continued

| Components | 1 phr | 2 phr | 3 phr | 4 phr | 5 phr | 6 phr | 7 phr | 8 phr |
|---|---|---|---|---|---|---|---|---|
| Melamine Octa-Molybdate | — | — | 1–50 | 1–50 | — | — | — | 1–50 |
| Calcium Molybdate | 1–25 | 1–25 | — | — | 1–25 | 1–25 | 1–25 | — |
| Calcium Carbonate | 0.1–5 | 0.1–5 | 0.1–5 | 0.1–5 | 0.1–5 | 0.1–5 | 0.1–5 | 0.1–5 |
| Polyethylene Wax | 0.1–3 | 0.1–3 | 0.1–3 | 0.1–3 | 0.1–3 | 0.1–3 | 0.1–3 | 0.1–3 |
| Adipate Ester Plasticizer | 1–50 | — | 1–50 | — | 1–50 | — | 1–50 | — |
| Antioxidants | 0.1–5 | 0.1–5 | 0.1–5 | 0.1–5 | 0.1–5 | 0.1–5 | 0.1–5 | 0.1–5 |
| Titanium Oxide | 0.1–10 | 0.1–10 | 0.1–10 | 0.1–10 | 0.1–10 | 0.1–10 | 0.1–10 | 0.1–10 |
| Nanocomposite Clay | — | 0.1–20 | — | 0.1–20 | — | — | — | 0.1–20 |
| Graphite Powder | — | — | — | — | — | — | — | 1–20 |
| Brominated Phthalate Plasticizer | — | — | — | — | — | — | 1–50 | — |
| Properties | | | | | | | | |
| Specific Gravity | 1.89 | 1.74 | 1.68 | 1.73 | 1.82 | 1.68 | 1.62 | 1.70 |
| Durometer D (Inst./15 sec.) | 61/49 | 68/55 | 60/48 | 67/55 | 51/41 | 58/48 | 43/34 | 68/55 |
| Tensile-Tape | 3020 | 3050 | 2800 | 2850 | 2149 | 2359 | 1472 | 2685 |
| Elongation-Tape | 515 | 525 | 600 | 525 | 485 | 433 | 383 | 210 |
| Air Oven Aging: 7 days @ 165 C. | | | | | | | | |
| Ret. Tensile (%) | 93 | 102 | NA | NA | NA | NA | NA | NA |
| Ret. Elongation (%) | 89 | 101 | NA | NA | NA | NA | NA | NA |
| Brittle Point (C.) | −22 | <14 | −25 | −18 | −33 | NA | NA | −2 |
| Oxygen Index (0.125") | 50 | 53 | 52 | 57 | 45.5 | 52 | 45.5 | 62 |
| Smoke (%) | <1 | <1 | <1 | <1 | 1.2 | 2.0 | 1.7 | <1 |
| Smoke Color | Lt. Blue | Lt. Blue | Lt. Blue | Lt. Blue | Lt. Grey | Lt. Grey | Lt. Grey | Blue–Grey |
| Dielectric Constant (1 GHz) | 2.88 | 3.08 | 2.90 | 2.92 | NA | NA | NA | 3.41 |
| Dissipation Factor (1 GHz) | 0.057 | 0.060 | 0.058 | 0.054 | NA | NA | NA | 0.060 |

The examples in Table I above illustrate batches using PVDF fluoropolymer and olefinic polymers as the base polymer system. The synergistic effect of melamine octa-molybdate and nanocomposite is evident for the above examples 4 and 5. The example 5 demonstrate the benefits of the synergistic effect of having both the melamine octa-molybdate and nanocomposite in the composition. The present technique also permits the production of certain novel flame retardant and low smoke compositions and therefore in a still further aspect the invention, provides a low heat release material. Cone Calorimeter and cable W fire tests such as UL-910 tests are used to determine the combustion properties of the various batches. The Cone Calorimeter study is reported in Table II.

TABLE II

Heat & Visible Smoke Release Rates Using an Oxygen Consumption Cone Calorimeter

| | | Heat Release Rate (kw/m2) | | Smoke Release Rate (m2/kg) | |
|---|---|---|---|---|---|
| | Heat Flux (kw/m2) | Peak | Average | Peak | Average |
| Table I (Batch 2) | 70 | 32.8 | 19 | 149.1 | 27.6 |
| Table I (Batch 3) | 70 | 21.2 | 15.6 | 27.6 | 23.2 |
| Table I (Batch 5) | 70 | 23.8 | 18.1 | 137.6 | 17.1 |

The UL 910 Steiner Tunnel Test has been used for the burning of cables resultant from the selective laboratory batches. These cables were burned according to NFPA 262, Underwriters Laboratories (UL-910), or Canadian Standards Association (CSA FT-6). The example test conditions are as follows: a 300,000 BTU/hour flame is applied for 20 minutes to ten 24-foot lengths of test cables mounted on a horizontal tray within a tunnel.

Detailed example cable test results are summarized in Table III below:

TABLE III

UL 910/NFPA 262 Steiner Tunnel Burn Test Data

| | | Smoke | | Flame | Cable Construction |
|---|---|---|---|---|---|
| Jacket | Insulation | Peak | Average | Spread (C.) | (Planum) |
| Table I (Batch 3) | FR Olefin | 0.24 | 0.06 | 4.2 | 4 UTP |
| Table I (Batch 4) | HDRE Foam | 0.32 | 0.06 | 5.5 | 4 STP |

Table IV below lists batches that are based on a fluoroelastomer, polyvinylchloride and olefinic blend polymerlsystem. These examples also illustrate the synergistic effect obtained by including nanocomposite and melamine octa-molybdate whereby these blends exhibit enhanced physical, electrical, and combustion properties. The synergistic effect is further evident on example batch 2. This demonstrates the benefits of the synergistic effect of having both the nanocomposite and melamine octa-molybdate in the composition.

TABLE IV

| Components | 1 phr | 2 phr |
|---|---|---|
| PVDF Resin | 1–100 | 1–100 |
| Acrylate Copolymer | 1–50 | 1–50 |
| Ethyl Vinyl Acetate | 1–50 | 1–50 |
| PVC Resin | 1–100 | 100 |
| Melamine Octa-Molybdate | — | 1–50 |
| Calcium Molybdate | 1–25 | — |
| Calcium Carbonate | 0.1–5 | — |
| Calcium Stearate | — | 0.1–5 |
| Zinc Stannate | — | 1–50 |
| Antimony Oxide LSFR | 1–25 | 1–25 |
| Mineral Filler | 1–50 | — |
| Polyethylene Wax | 0.1–5 | — |
| Adipate Ester Plasticizer | 1–50 | 1–50 |

TABLE IV-continued

| Components | 1 phr | 2 phr |
|---|---|---|
| Antioxidants | 0.1–10 | 0.1–10 |
| Titanium Oxide | 0.1–10 | 0.1–10 |
| Nanocomposite Clay | — | 0.1–25 |
| Lead Stabilizers | 1–15 | 1–15 |
| Brominated Phthalate Plasticizer | 1–75 | 1–75 |
| Total Properties | | |
| Specific Gravity | 1.54 | 1.57 |
| Durometer D (Inst./15 sec.) | 64/47 | 63/47 |
| Tensile-Tape (psi) | 2810 | 3200 |
| Elongation-Tape (%) | 385 | 400 |
| Air Oven Aging: 7 days @ 136 C. | | |
| Ret. Tensile (%) | NA | 115 |
| Ret. Elongation (%) | NA | 90 |
| Brittle Point (C.) | −4 | −11 |
| Oxygen Index (0.125") | 46 | 52 |
| Smoke (%) | 7.8 | 5.6 |
| Smoke Color | Dark Grey | Dark Grey |
| Dielectric Constant (1 GHz) | 2.64 | 2.66 |
| Dissipation Factor (1 GHz) | 0.024 | 0.026 |

The specific embodiment components used in this invention are summarized in Table V.

TABLE V

| Components | Chemical Composition |
|---|---|
| PVDF Resin | Vinylidene Fluoride-Chlorotrifluoro-ethylene Copolymer |
| Acrylate Copolymer | Methylene Methyl Acrylate Copolymer |
| Acrylate Terpolymer | Ethylene-Acrylic Ester-Glycidyl Methacrylate Terpolymer |
| Ethylene Acrylic Terpolymer | Ethylene Methyl Acrylate Terpolymer |
| EVA Copolymer | Ethyl Vinyl Acetate Copolymer (60% VA) |
| PVC Resin | Extrusion Grade (IV: 0.90–1.60, RV: 2.10–3.50) |
| Melamine Octa-Molybdate | Melamine Octamolybdate Powder (particle size: 1–4 micron) |
| Calcium Molybdate | Calcium Molybdate Powder (particle size: 1–4 micron) |
| Calcium Carbonate | Calcium Carbonate Powder (particle size: <1 micron) |
| Calcium Stearate | Calcium Stearate Powder |
| Zinc Stannate | Zinc Stannate Powder (particle size: 1–4 micron) |
| Antimony Oxide LSFR | Antimony Oxide Low Smoke (Zinc Modified) |
| Mineral Filler | Hard and Soft Clays |
| Polyethylene Wax | Linear Non-Polar Polyethylene Waxes |
| Adipate Ester Plasticizer | Adipate Ester (Molecular Weight: >2000) |
| Antioxidants | Hindered Phenolic, Thioester, Phsphite Types |
| Titanium Oxide | Titanium Oxide Powder (particle size: <1 micron) |
| Nanocomposite Clay | Cloisite 15A (Southern Clay Products) |
| Lead Stabilizers | Lead Phthalate and Sulfate powders |
| Brominated Phthalate Plasticizer | Tribromophthalate, Tetrabromo-phthalate, tetrabromobenzoate Mixture |

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A non-dripping, flame retardant, fluoropolymeric composition comprising:
   (a) a fluoropolymeric base polymer; and
   (b) a nanoclay additive;
   said composition having a limiting oxygen index in the range of 45.5% to 62%.

2. The composition of claim 1 wherein said fluoropolymeric base polymer is selected from the group consisting of polytetrafluoroethylene (PTFE) fluorocarbons, fluorinated ethylene/propylene (FEP) fluorocarbons, perfluoroalkoxy (PFA) fluorocarbons, ethylene tetrafluoroethylene (ETFE) fluoropolymers, polyvinylidene (PVDF) fluoropolymers, ethylene chlorotrifluoroethylene (ECTFE) fluoropolymers, and fluoro-chlorinated homopolymers, copolymers and terpolymers.

3. The composition of claim 1 further comprising:
   (c) an olefinic polymer.

4. The composition of claim 3 wherein said olefinic polymer is selected from the group consisting of very low density polyethylene (VLDPE), low density polyethylene (LDPE), linear low density polyethylene (LLDPE), high density polyethylene (HDPE), polypropylene (PP), and ethylene propylene rubber (EPR).

5. The composition of claim 3 wherein the group from which said olefinic polymer is selected further consists of ethylene-based homopolymers, copolymers and terpolymers.

6. The composition of claim 3 wherein said at least one olefinic polymer is crosslinked.

7. The composition of claim 6 wherein said at least one olefinic polymer is crosslinked using an organic peroxide.

8. The composition of claim 1 further comprising:
   (c) one of an acetate resin and an acrylate resin.

9. The composition of claim 8 wherein said one of an acetate resin and an acrylate resin is selected from the group consisting of ethyl vinyl acetate (EVA), ethylene ethyl acrylate (EEA), ethylene methyl acrylate (EMA), and ethylene butyl acrylate (EBA).

10. The composition of claim 1 further comprising:
    (c) polyvinylchloride resin.

11. The composition of claim 1 further comprising:
    (c) an olefinic polymer; and
    (d) one of an acetate resin and an acrylate resin.

12. The composition of claim 1 further comprising:
    (c) an olefinic polymer; and
    (d) polyvinylchloride resin.

13. The composition of claim 1 further comprising:
    (c) an olefinic polymer;
    (d) one of an acetate resin and an acrylate resin; and
    (e) polyvinylchloride resin.

14. The composition of claim 1 wherein said nanoclay additive is selected from the group consisting of synthetic silicate montmorillonites, natural layered silicate montmorillonites and a layered alumna-silicate.

15. The composition of claim 14 wherein the individual platelets of said nanoclay additive are approximately 1 micron in diameter.

16. The composition of claim 14 wherein said nanoclay additive is chemically modified to increase its hydrophobicity.

17. The composition of claim 1 further comprising a filler selected from the group consisting of metal hydrates, oxides, carbonates, talcs, clays, molybdates, borates, stannates, carbon blacks, silicates, and phosphates.

18. The composition of claim 1 further comprising an additive comprising at least one substance selected from the group consisting of an antioxidant, a pigment, and a lubricant.

19. A method for preparing an exfoliated thermoplastic elastomer blend of a fluoropolymer and a nanocomposite, said blend having a limiting oxygen index in the range of 45.5% to 62%, comprising dynamically mixing said fluoropolymer and said nanocomposite in a ratio of from about 99:1 to about 50:50 parts by weight, respectively.

20. The method of claim 19 wherein at least one of an antioxidant, a lubricant and a pigment contacts said blend during mixing.

21. The composition of claim 1 further comprising:
(c) melamine octa-molybdate.

22. The composition of claim 21 wherein said melamine octa-molybdate is present in an amount of 1–50 percent by weight of the fluoropolymeric base polymer.

23. A non-dripping, flame retardant fluoropoymeric composition comprising:
(a) PVDF resin; and
(b) a nanoclay selected from the group consisting of synthetic silicate montmorillonites, natural layered silicate montmorillonites and a layered alumna-silicate; said composition having a limiting oxygen index in the range of 45.5% to 62%.

24. The composition of claim 23 wherein said nanoclay additive is present in an amount of 0.1–25 percent by weight of the polyvinylidene fluoride base polymer.

* * * * *